Mar. 13, 1923.

M. A. McGILL 1,448,555

NUT LOCK

Filed Dec. 9, 1921

M A McGill, INVENTOR.

BY Geo. P. Kimmel, ATTORNEY.

Patented Mar. 13, 1923.

1,448,555

UNITED STATES PATENT OFFICE.

MILTON ADAIR McGILL, OF PITTSBURGH, PENNSYLVANIA.

NUT LOCK.

Application filed December 9, 1921. Serial No. 521,174.

*To all whom it may concern:*

Be it known that I, MILTON A. McGILL, a citizen of the United States, residing at Pittsburgh, in the county of Allegheny and State of Pennsylvania, have invented certain new and useful Improvements in Nut Locks, of which the following is a specification.

This invention relates to nut locks, and has for one of its objects to simplify and improve the construction and increase the utility and efficiency of a device of this character.

With these and other objects in view and others which will be manifest and suggested as the nature and purpose of my invention are revealed in the following specification and drawing, wherein I have shown a practical, yet preferred embodiment thereof.

In the accompanying drawings—

Figure 1:
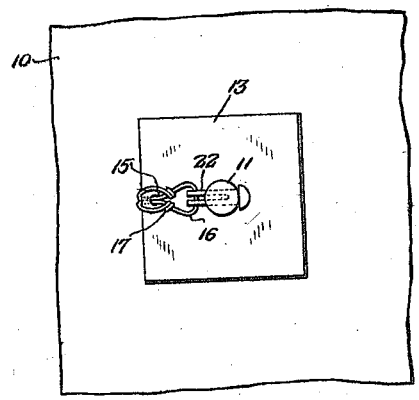
Fig. 1 is a front elevation.
Figure 3:
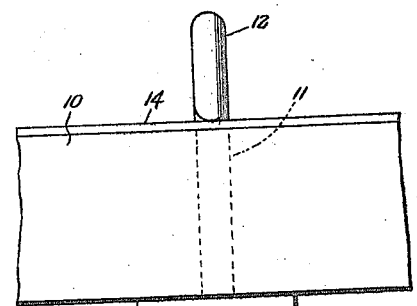
Fig. 3 is an enlarged perspective view of the split key employed in the structure shown in Figs. 1 and 2.
Figure 2:
Fig. 2 is a plan view.

The improved device may be adapted without material structural change to bolts and nuts of various sizes, but is more especially adapted to hold the nuts from retrograde movement or working off from the bolts of the drawer pulls of furniture and the like, and for the purpose of illustration is shown thus applied, 10 indicating a section of a drawer front, 11 one of the bolts including an eye 12 to which the pull member is adapted to be attached, and 13 the nut engaging the threaded part of the bolt and bearing against the interior of the member 10.

14 represents the escutcheon or bearing plate on the front face of the member 10 and through which the bolt operates.

The improved device may also be applied to bolts having the usual heads.

An aperture is formed through the bolt large enough to receive a split pin 22, the latter having apertures in its split end to receive a bendable member 16 which is bent into U-shape and passed through an aperture 15 in the nut 13 and secured by twisting the terminals, as shown.

The preferred embodiment of the invention is disclosed in the drawings and set forth in the specification, but it will be understood that modifications within the scope of the claim may be made in the construction without departing from the principle of the invention or sacrificing any of its advantages.

Having thus described the invention, what is claimed as new is:—

In a device of the class described, a bolt having a transverse aperture through its threaded portion, a nut engaging the bolt and having an aperture therethrough, a headed pin extending through the aperture of the bolt and having a transverse aperture, and a bendable element extending through the aperture of the pin and through the aperture of the nut.

In testimony whereof, I affix my signature hereto.

MILTON ADAIR McGILL.